Patented Dec. 9, 1947

2,432,177

UNITED STATES PATENT OFFICE 2,432,177

REGULATING THERMAL GAS TURBINE MOTIVE UNIT USED FOR DRIVING ELECTRIC DIRECT CURRENT GENERATORS

Marcel Henri Louis Sédille, Paris, France, assignor to Société Rateau (Société Anonyme), Paris, France, a company of France Application June 11, 1945, Serial No. 598,762
In France July 10, 1941

5 Claims. (Cl. 290—2)

The present invention relates to a system for regulating thermal gas turbine motive units driving direct current generators. It applies to thermal motive units in which the auxiliary turbine or turbines driving the air compressor or compressors are distinct from the motive turbines delivering the useful power, and are set on different shafts which can rotate at different speeds. Otherwise the thermal motive unit can be of any type whatever.

It is well known that if the compressor or compressors be driven by one or more special turbines distinct from the motive turbine or turbines which drive the electric generator, the speed of these auxiliary units adjusts itself alone, so that the operation of a compressor and of its governing turbine will always take place substantially, for all loads, at the point of maximum yield.

On the contrary, the speed of the motive turbine or turbines often depends on the receiving or driven apparatus and the variations in this speed may not be such that its or their yields are a maximum for all loads.

When the receiving apparatus is a direct current generator, it is the voltage supplied by the latter which must obey certain laws such as: substantially constant value if the generator is to supply a lighting circuit or variable value when the generator supplies motors drawing or propelling vehicles for example or is used in any other application requiring variations in operating conditions. The power supplied depending on the speed and on the excitation of the generator, it is in consequence possible to vary the excitation in order to give the motive turbine any one speed desired, while respecting the voltage law imposed in function of the load.

The object of the present invention is a regulation system in which the excitation of the generator is acted upon so as to bring its speed, for a given load, to that value which corresponds to the maximum yield of the turbine for that load.

The description which will follow with reference to the appended drawing, given by way of non-limitative example, will allow a thorough understanding of how the invention can be embodied, those peculiarities which appear in the drawing as well as in the text constituting, of course, a part of said invention.

Figure 1:
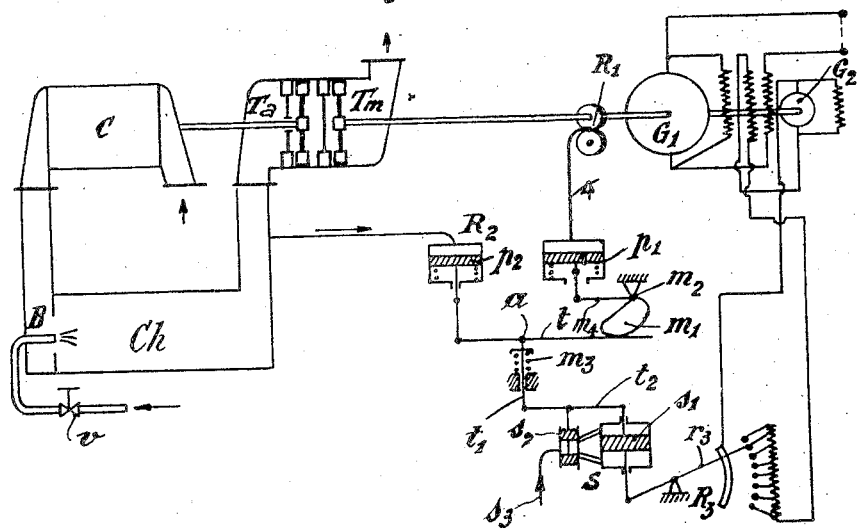
Figures 1 and 2 represent the regulating of a thermal gas turbine motive unit driving a variable potential direct current generator, the variations in the load being obtained in the case of Fig. 1 by acting on the quantity of fuel fed to the burner and in that of Fig. 2 by acting on the field rheostat.

In the embodiment shown in Fig. 1, the thermal gas turbine motive unit comprises two turbines fed in series, one of which $Ta$ governs the air compressor C, and the other $Tm$ drives an electric, direct current generator $G_1$. The turbines $Ta$ and $Tm$ are preferably set in one and the same case and rotate in opposite directions according to the arrangements set forth in United States Patent No. 2,312,995.

In such a lay-out, the auxiliary turbine $Ta$ assumes by itself a speed of rotation which substantially corresponds to the condition of the maximum yield of this turbine. It is consequently useless to adjust this speed. As for the governing of the speed of the motive turbine $Tm$, the provisions of the invention are such that, at any instant, the speed of the turbine is brought to that value which corresponds to the maximum yield of the thermal motive unit for the load to which it is subjected at the moment under consideration. On Fig. 1 these provisions are the following:

An organ $R_1$, sensitive to the speed of the motive turbine $Tm$, which organ, in the example considered, is a tachometric pump (oil pump, for example supplying a pressure which is a function of the speed), acts, through means, which will be described hereafter, on one of the extremities of a swingle-tree $t$. This swingle-tree is connected as will be seen hereunder to the field rheostat $R_3$ of the generator $G_1$ or, as the case may be, to the field rheostat of the exciting dynamo $G_2$ of the generator $G_1$. (On the drawing it is assumed that the generator $G_1$ is a compound generator and comprises moreover a field winding excited by an auxiliary generator $G_2$; the rheostat $R_3$ governs this circuit of supplementary excitation.)

An organ $R_2$ acts on the other extremity of the swingle-tree $t$ which organ is sensitive to the load of the motive set or to any other quantity which depends solely on this load, for example, to the pressure prevailing ahead of the turbines, at the delivery end of the combustion chamber $Ch$.

On Figure 1, the hydraulic pressure created by the tachometric pump $R_1$ governs a piston $p_1$ balanced by a spring. The organ $R_2$ also comprises a piston $p_2$ balanced by a spring and subjected to the pressure of the gases during admission into the turbines.

The connection between the piston $p_1$ and the swingle-tree $t$ is obtained by means of a cam $m_1$ which rotates about a fixed point $m_2$ as a result of the movements given to it by this piston $p_1$, by means of a lever $m_4$ which acts as an integral part of the cam and which is pointed to the piston rod. A spring $m_3$ constantly holds one of the extremities of the swingle-tree against this cam. The connection between the other extremity of the swingle-tree and the piston $p_2$ is directly obtained by a connecting rod. The displacements of a point $a$, suitably chosen, on the swingle-tree, are transmitted by a rod $t_1$ to the operating lever $r_3$ of the regulating rheostat $R_3$, either directly, or, as in the example illustrated by means of a servomotor S. This well known servomotor comprises on the one hand a piston $s_1$ which acts on the lever $r_3$ of the rheostat and which is connected, as well as the motive fluid distributor $s_2$ (the fluid being supplied from $s_3$), to a swingle-tree $t_2$ jointed onto the rod $t_1$.

The variations in load of the thermal motive unit are obtained when required by acting on the opening of the admission valve $v$ through which the fuel is fed to the burner B or by any other similar means.

When the load is thus varied, the pressure $p$ of the gases which acts on the governor $R_2$ and which is a function of the load varies as well as the speed V of the motive turbine. The pistons $p_2$ and $p_1$ are displaced but the profile of the cam $m_1$ and the point $a$ of the swingle-tree $t$ are determined as a function of the relation $V=f(p)$ which binds one to another the quantity $p$ which is a function of the load (this quantity $p$ being the pressure of the motive gases, in the embodiment described) and the speed V giving for each load the optimum yield, so that the point $a$ is displaced in one direction or in the other only if the speed of the motive turbine deviates positively or negatively from that speed which obtains the optimum yield for the new load of the motive unit. If, for example, the motive turbine has a tendency to assume a speed lower than that which obtains the optimum yield for the new load, the displacement of the left-hand end of the swingle-tree $t$ is not balanced by an opposite displacement, of sufficient value, of the right-hand end because the cam $m_1$ has not revolved sufficiently and, consequently, the point $a$ moves, thereby actuating the field rheostat. The resisting couple of the generator $G_1$ is then diminished and the speed of $G_1$ and $Tm$ is readjusted to the desired value.

Of course, the governors $R_1$ and $R_2$ can comprise all the servomotors which are necessary.

Figure 2:
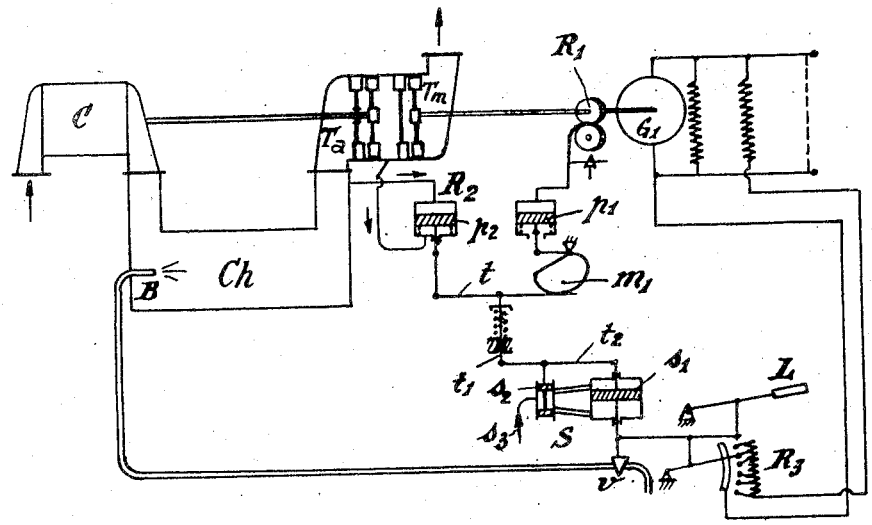

Fig. 2 shows another embodiment of the invention in the case of a thermal motive unit with auxiliary and motive turbines in series, the motive turbine driving a direct current generator the load L of which is fixed as required by acting on the operating lever of the field rheostat $R_2$ of the generator. The regulation then takes place in the following manner: the organ $R_1$ sensitive to the speed of the motive turbine acts in parallel with an organ $R_2$ sensitive to the load carried by the auxiliary turbine or to a quantity which is a function of this load, by means of a swingle-tree $t$ on a servomotor S controlling the feed valve $v$ for admitting the fuel to the combustion chamber $Ch$. The rod operating the valve $v$ can act, at the same time as the lever L, by means of a set of levers and handles on the field rheostat $R_3$.

By means similar to those described hereabove (cam $m_1$ and levers) the respective action of the regulators $R_1$ and $R_2$ is controlled in such a way that their resulting action is felt only for positive or negative speed deviations with respect to the relation $V=f(c)$ which determines the working conditions corresponding to an optimum yield of the thermal motive unit, V representing the rotation speed of the motive turbine and $c$ the load on the thermal motive unit. In the case of Fig. 2, $R_2$ has been represented by a piston sensitive to the differential pressure prevailing between the admission and the exhaust of the auxiliary turbine, this differential pressure being a well determined function of the load of the thermal motive unit.

If the thermal motive unit is considered for given working conditions for which the regulation is in equilibrium and if the operating lever L of the field rheostat be given such a displacement that for example, an increase in the field current results therefrom, the voltage at the terminals of $G_1$ increases as does, consequently, its load. As a result of this increase in load, the speed of $Tm$ diminishes and the regulator $R_1$ gives rise to an increase in the feed of fuel to the burner, by the opening of the valve $v$. The auxiliary turbine accelerates and the compressor discharges a larger volume of air, the differential pressure between points immediately ahead of and after the turbine $Tm$ increases thereby resulting in the operation of the regulator $R_2$. The speed of the turbine $Tm$ increases, resulting again in the operation of the regulator $R_1$. The combined action of the two regulators $R_1$ and $R_2$ will continue, by affecting the valve $v$ and simultaneously the position of the rheostat $R_3$ until the relation $V=f(c)$ corresponding to the new state of equilibrium is satisfied.

Figure 3:
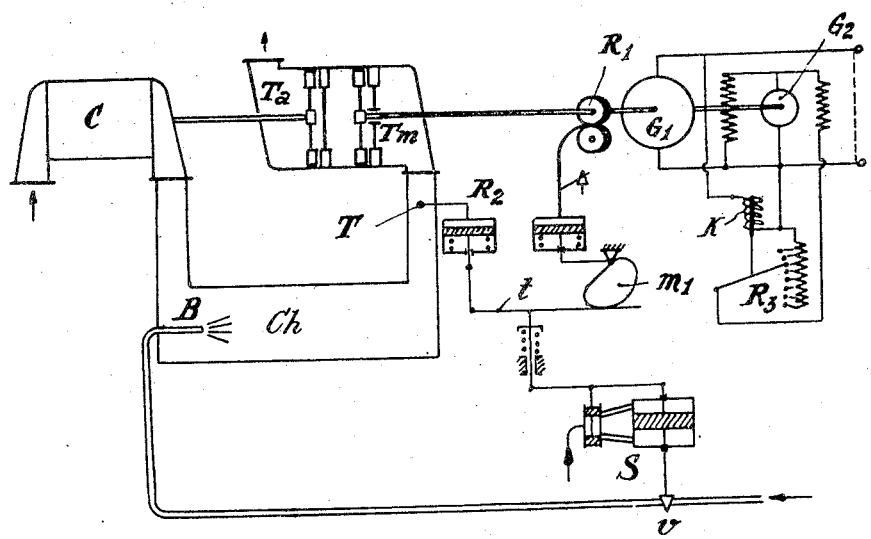
Fig. 3 represents the regulating of a thermal gas turbine motive unit driving a constant-potential direct current generator.

Fig. 3 shows a third embodiment of the invention applied to a thermal unit driving a direct current generator $G_1$ supplying a constant voltage circuit or network, the automatic regulating of the voltage being obtained by the field current of the exciting dynamo $G_2$ according to the well known method, in which the rheostat $R_3$ controlling the field current supplied by the dynamo $G_2$ is actuated by an electromagnet K which is energized by a shunt from the generator $G_1$.

If, for example, an increase of the load on the circuit occurs, a reduction in the speed of the turbine $Tm$ will follow; as a result of this condition, the regulator $R_1$ will act on the servomotor S governing the opening of the valve $v$ which controls the supply of fuel to the burner of the combustion chamber, thereby increasing the quantity of fuel supplied, the result is an increase in the motive couple and the speed of the turbine $Tm$ rises again. The regulator $R_2$ acts in relation to the temperature of the gases at the outlet end of the combustion chamber $Ch$ which temperature is a function of the load, the sensitive organ is a vapor tension thermometer T for example which acts on a piston balanced by a spring. The combined action of the regulators $R_1$ and $R_2$ is so governed, by appropriate levers and cams, that the turbine $Tm$ assumes a speed V which corresponds to the optimum yield for the load C; the maintenance of the voltage supplied by the generator being ensured, whatever the speed be, by the automatic adjustment of the excitation.

It is moreover obvious that the embodiments which have just been described have been given only by way of example and that they can be altered without, by so doing, departing from the scope of the invention.

What I claim is:

1. In a gas turbine motive unit comprising a motive turbine capable of delivering power, an auxiliary turbine mechanically independent of the motive turbine, an air compressor driven by the auxiliary turbine, means for burning a fuel in the air delivered by the compressor, means for feeding the turbines with the hot gases thus produced and an electric generator of variable excitation driven by the motive turbine, the regulating method which consists in causing the excitation of the electric generator to vary as a function of the load, until the speed of the generator and of the motive turbine reaches the value which corresponds, for each load, to the optimum yield of the motive turbine.

2. In a gas turbine motive unit comprising a motive turbine capable of delivering power, an auxiliary turbine mechanically independent of the motive turbine, an air compressor driven by the auxiliary turbine, means for burning a fuel in the air delivered by the compressor, means for feeding the turbines with the hot gases thus produced, an electric generator driven by the motive turbine, means for causing the excitation of this generator to vary, means sensitive to the variations in load of the motive turbine, other means sensitive to the speed variations of this turbine and means for compounding the indications of the said means sensitive to the load and to the speed and for regulating both the excitation of the generator and the speed of the motive turbine, so that, for each load, the speed of the motive turbine corresponds to the optimum yield.

3. In a gas turbine motive unit comprising a motive turbine capable of delivering power, an auxiliary turbine mechanically independent of the motive turbine, an air compressor driven by the auxiliary turbine, means for burning a fuel in the air delivered by the compressor, means for feeding the turbines with the hot gases thus produced, an electric generator driven by the motive turbine, a regulator for controlling the excitation of this generator, means sensitive to the variations in load of the motive turbine, other means sensitive to the speed variations of this turbine, a device provided with levers on which device the said means act in opposite directions and means for connecting to the said regulator for controlling the excitation, a point of the said lever device, the displacement of the said point being nil when the speed of the motive turbine gives the optimum yield corresponding to the load, and means for causing the load to vary by controlling the quantity of fuel consumed.

4. In a gas turbine motive unit comprising a motive turbine capable of delivering power, an auxiliary turbine mechanically independent of the motive turbine, an air compressor driven by the auxiliary turbine, means for burning a fuel in the air supplied by the compressor, means for feeding the turbines with the hot gases thus produced, an electric generator driven by the motive turbine, a regulator for controlling the excitation of this generator, means sensitive to the variations in load of the motive turbine, other means sensitive to the speed variations of this turbine, a device provided with levers on which device the said means act in opposite directions, a valve for regulating the fuel feed, means for connecting, in conjunction, to the said valve and to the said regulator, a point of the said lever device the displacement of which is nil when the speed of the motive turbine gives the optimum yield corresponding to the load and means for causing the load to vary by acting on the said valve.

5. In a gas turbine motive unit comprising a motive turbine capable of delivering power, an auxiliary turbine mechanically independent of the motive turbine, an air compressor driven by the auxiliary turbine, means for burning a fuel in the air delivered by the compressor, means for feeding the turbines with the gases thus produced, an electric generator driven by the motive turbine, means for controlling the excitation of this generator suitable for obtaining a constant terminal voltage for this generator, the said means comprising a relay which acts on a field rheostat of the said generator, means sensitive to the load of the motive turbine, means sensitive to the speed of the said turbine, a device provided with levers on which device the said means act in opposite directions, a valve for controlling the fuel feed and means for connecting this valve to a point of the said lever device the displacement of the said point being nil when the speed of the motive turbine gives the optimum yield corresponding to the load.

MARCEL HENRI LOUIS SÉDILLE.

REFERENCES CITED

The following references are of record in the file of this patent:

UNITED STATES PATENTS

| Number | Name | Date |
| --- | --- | --- |
| Re. 19,114 | Stein et al. | Mar. 31, 1934 |
| 1,978,837 | Forsling | Oct. 30, 1934 |
| 2,165,175 | Dickey et al. | July 4, 1939 |
| 2,178,355 | Brunner | Oct. 31, 1939 |
| 2,180,168 | Puffer | Nov. 14, 1939 |
| 2,193,114 | Seippel | Mar. 12, 1940 |
| 2,262,558 | Schwendner | Nov. 11, 1941 |
| 2,263,705 | Seippel | Nov. 25, 1941 |
| 2,339,185 | Nettel | Jan. 11, 1944 |